United States Patent [19]

Arjarasumpun

[11] Patent Number: 5,076,680
[45] Date of Patent: Dec. 31, 1991

[54] BIOLOGICAL SPECIMEN HOLDER FOR MICROSCOPIC EXAMINATION

[76] Inventor: Narong Arjarasumpun, 277 Olympia Dr., River Edge, N.J. 07661

[21] Appl. No.: 548,245

[22] Filed: Jul. 5, 1990

[51] Int. Cl.[5] .................... G02B 21/26; G01N 21/29
[52] U.S. Cl. ................................... 359/391; 356/246
[58] Field of Search ............... 350/529, 536; 356/244, 356/400, 246

[56] References Cited

U.S. PATENT DOCUMENTS

| | | | |
|---|---|---|---|
| 3,847,482 | 11/1974 | Sokol et al. | 356/244 |
| 3,977,794 | 8/1976 | Liedholz | 356/244 |
| 4,609,991 | 9/1986 | Minton et al. | 356/246 |

FOREIGN PATENT DOCUMENTS

| | | | |
|---|---|---|---|
| 21752 | 2/1979 | Japan | 350/529 |

Primary Examiner—Jon W. Henry
Attorney, Agent, or Firm—Samuelson & Jacob

[57] ABSTRACT

A holder is selectively secured to the stage of a microscope for adapting the microscope to hold a test tube oriented horizontally between the microscope objective and a light source for microscopic examination of a biological specimen while retained in the test tube, thereby eliminating the necessity of preparing a microscope slide for the specimen. The holder includes a base assembled of slotted base plates selectively slidable relative to one another to be fitted to the microscope so as to establish a slot for retaining the test tube in registration with the microscope objective and the light source, and fasteners for fastening the base plates together in secure attachment to the stage of the microscope.

15 Claims, 1 Drawing Sheet

U.S. Patent
Dec. 31, 1991
5,076,680
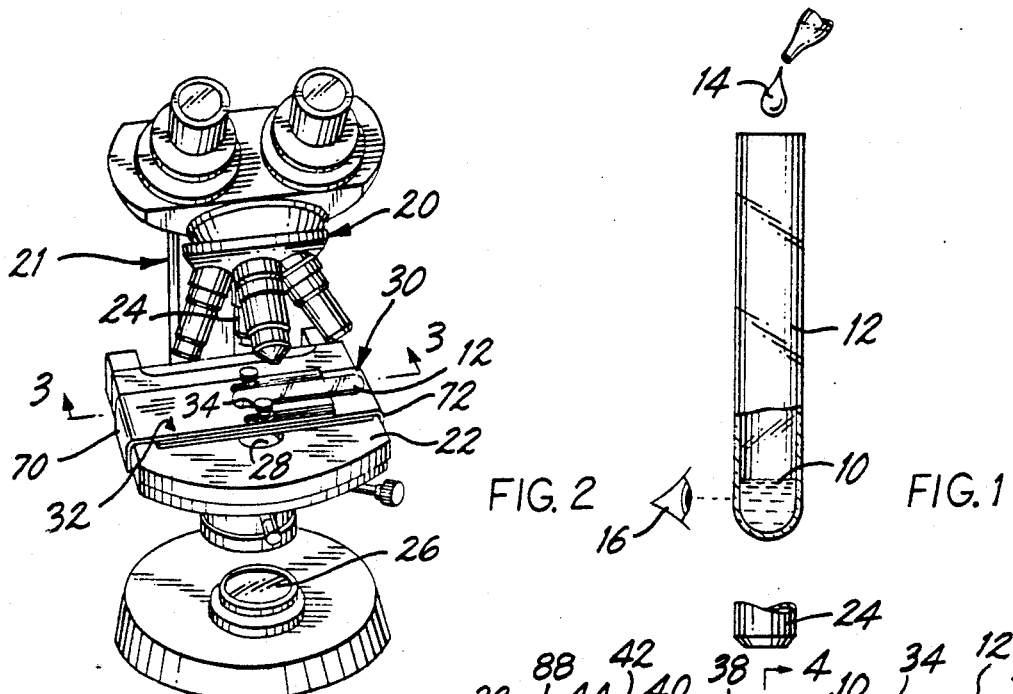
FIG. 1
FIG. 2
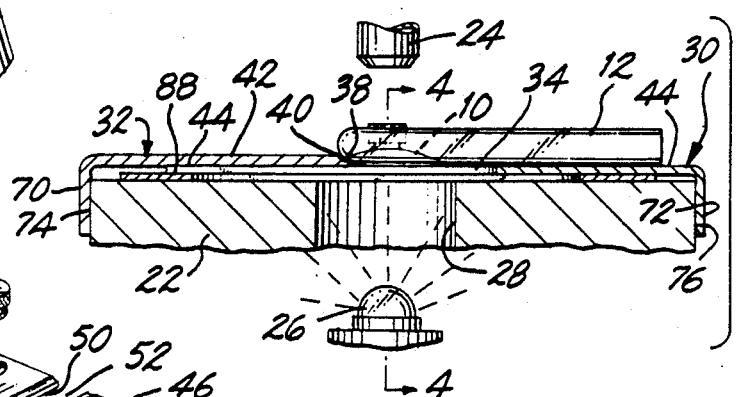
FIG. 3
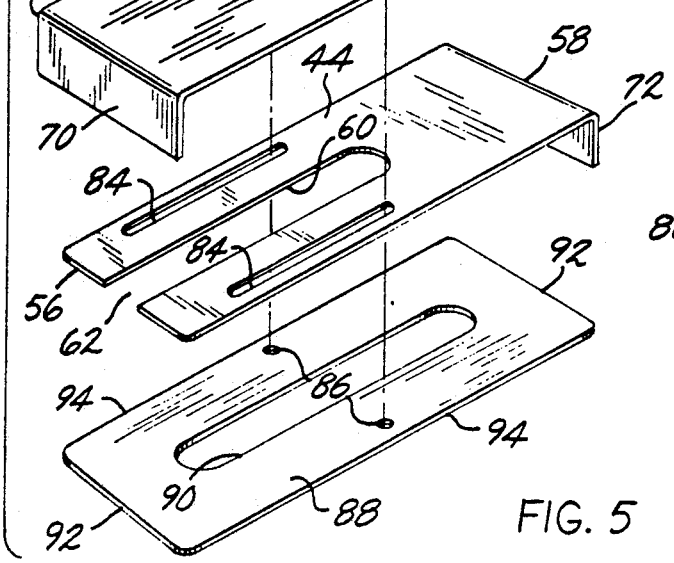
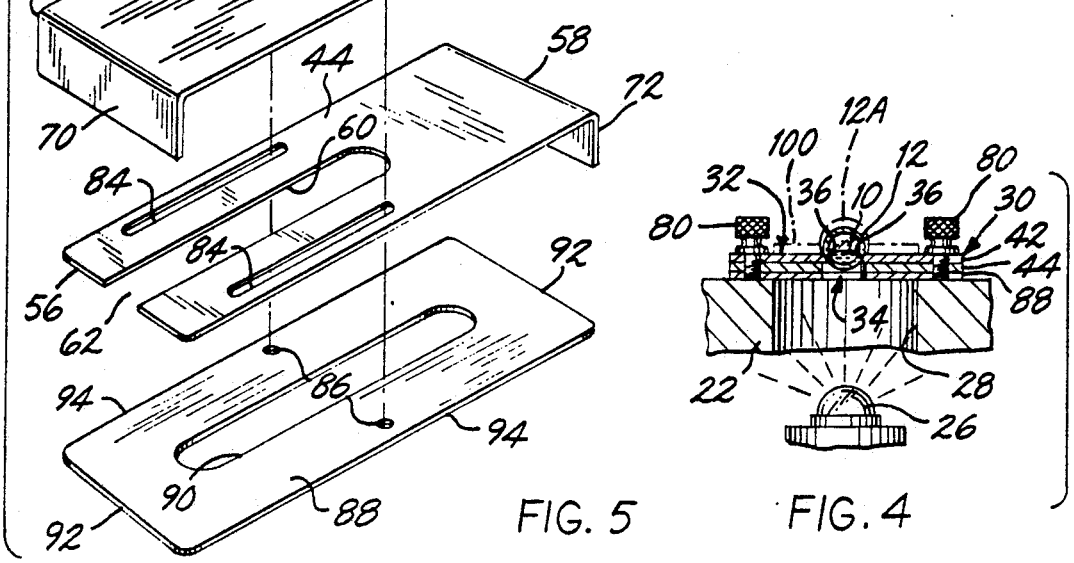
FIG. 4
FIG. 5

BIOLOGICAL SPECIMEN HOLDER FOR MICROSCOPIC EXAMINATION

The present invention relates generally to the microscopic examination of biological specimens and pertains, more specifically, to a holder capable of being affixed to a microscope for holding in place for microscopic examination a biological specimen placed within a transparent cylindrical specimen-retention tube.

An ever-increasing demand for the examination of biological specimens, and especially for the microscopic examination of blood samples in connection with blood bank procedures, has led to the quest for apparatus which can accelerate the required procedures so as to expedite the processing of larger numbers of biological specimens, while maintaining the high standards demanded for such examinations. The examination of blood samples in blood bank procedures usually entails macro-examination of a blood specimen while the specimen is retained in a standard transparent cylindrical test tube and then transfer of the specimen to a microscope slide for a microscopic examination. The purpose of both the macro-examination and the microscopic examination is to observe the degree of agglutination which occurs in response to treatment with certain reagents. The observation of the agglutination characteristics of the observed specimen is used, for example, as a procedure for antibody screening, antibody identification, cross-matching, and for direct Coombs testing.

The present invention provides apparatus which enables the elimination of the extra step of preparing a separate microscope slide for the microscopic examination of a biological specimen retained in a transparent cylindrical specimen-retention tube and, as such, attains several objects and advantages, some of which may be summarized as follows: Reduces the time required for the examination procedure in that both the macro-examination and the microscopic examination procedures can be accomplished with the specimen retained in the same standard test tube; simplifies the microscopic examination procedure and reduces expense in that no separate slide is required for the microscopic examination; essentially eliminates any possibility of contamination which could be caused by an infectious specimen, as by the spread of a viral infection such as hepatitis or AIDS, or by any blood-transmitted disease; since the specimen remains in the same test tube throughout the entire test procedure; enables the processing of a greater number of biological specimens within a shorter time, while maintaining accuracy; increases the efficiency of laboratory technicians through the elimination of the added task of preparing microscope slides and the concomitant tedium of the task; provides a simple and economically manufactured apparatus which is adapted readily to practically all laboratory microscopes, enabling widespread use in the expeditious and accurate attainment of test results with minimal modification of such existing equipment; enables modification of existing microscopes for a more expeditious testing procedure, without precluding use of the modified microscope for the examination of standard specimen-examination slides; and meets the demand for the testing of larger numbers of biological specimens, with speed and accuracy, while maintaining safety.

The above objects and advantages, as well as further objects and advantages, are attained by the present invention which may be described briefly as a holder for facilitating the examination in a microscope of a biological specimen placed within a transparent cylindrical specimen-retention tube of predetermined diameter, the microscope including a frame, a microscope objective on the frame and a light source, the holder comprising: a base; a slot passing through the base in an altitudinal direction, the slot extending longitudinally along the base and having a lateral width less than the predetermined diameter of the tube, the lateral width of the slot being great enough to retain the tube on the base against inadvertent lateral rolling movement out of registration with the slot; and affixing means on the base for affixing the base to the frame of the microscope in place between the microscope objective and the light source and with the slot registered in altitudinal alignment with the objective and the light source of the microscope and oriented generally horizontally such that upon placement of the tube in the slot, in longitudinal alignment with the slot, the tube will be retained in place between the objective and the light source in a generally horizontal orientation for microscopic examination of the biological specimen.

The invention will be understood more fully, while still further objects and advantages will become apparent, in the following detailed description of a preferred embodiment of the invention illustrated in the accompanying drawing, in which:

FIG. 1 is an elevational view, partially sectioned, of a standard test tube containing a biological specimen being prepared for examination;

FIG. 2 is a pictorial perspective view of a laboratory microscope to which there is affixed an apparatus of the present invention;

FIG. 3 is an enlarged cross-sectional view taken along line 3—3 of FIG. 2;

FIG. 4 is a cross-sectional view taken along line 4—4 of FIG. 3; and

FIG. 5 is an exploded perspective view of the apparatus of the invention.

Referring now to the drawing, and especially to FIG. 1 thereof, a biological specimen in the form of a blood sample 10 is placed in a transparent cylindrical specimen-retention tube of predetermined diameter, illustrated in the form of a standard test tube 12. In accordance with well-known blood bank procedures, a macro-examination of the blood sample 10 is accomplished by treating the sample 10 with a reagent 14 and then observing the sample 10 directly, as illustrated schematically at 16, for the occurrence of agglutination. Subsequently, a microscopic examination of the sample 10 is carried out so as further to observe the agglutination characteristics of the biological specimen.

As shown in FIG. 2, a laboratory microscope 20 has a frame 21 which includes a stage 22 located between an objective 24 and a light source 26. Items to be examined microscopically are placed over an aperture 28 in the stage 22 and are viewed through the objective 24 with the aid of light from the light source 26, all as is now well-known in laboratory procedures. Ordinarily, a microscope slide is rested on the stage 22 in registration with the aperture 28 for examination of a biological specimen retained in the slide; however, in the illustration of FIG. 2, an apparatus of the present invention is affixed to the stage 22 so that a specimen placed within a transparent cylindrical specimen-retention tube, such as sample 10 illustrated in test tube 12 in FIG. 1, may be microscopically examined directly, without the necessity of preparing a microscope slide. The apparatus is illustrated in the form of a holder 30 constructed in accordance with the invention and secured to the stage 22 of microscope 20. Holder 30 includes a base 32 having a slot 34 extending longitudinally along the base 32 and passing altitudinally through the base 32. Slot 34 has a lateral width somewhat less than the predetermined diameter of the test tube 12 and is registered with the aperture 28 in the stage 22 so that the test tube 12 need merely be placed in the slot 34, as shown in FIG. 2, with the test tube 12 lying in a horizontal orientation, in longitudinal alignment with the slot 34, between the objective 24 and the light source 26.

Turning now to FIGS. 3 and 4, sample 10 is of a volume small enough so as to remain within the test tube 12, adjacent the bottom of the test tube 12, when the test tube 12 is placed in the slot 34 in the base 32 of the holder 30, as illustrated. The slot 34 is registered with the aperture 28 so that light from the light source 26 is passed through the transparent test tube 12 and the sample 10 therein for microscopic examination through the objective 24 of microscope 20. Slot 34 includes upwardly-facing beveled edges 36 for facilitating the appropriate registration and retention of the test tube 12 in the slot 34. It is noted that the standard test tubes employed in the procedures outlined above basically are supplied in two predetermined diameters, namely, ten millimeters and twelve millimeters. As illustrated in FIG. 4, the lateral width of slot 34 is such that either one of the smaller diameter test tube 12 or the larger diameter test tube, shown in phantom at 12A, is retained in the slot 34 against inadvertent lateral rolling movement out of the slot 34 and out of proper registration with the aperture 28. The beveled edges 36 assist in the lateral location and retention of the test tubes 12 and 12A. In addition, the inclusion of a bevel 38 at the end portion 40 of the slot 34 complementary to the rounded closed end of each test tube assists in the placement and retention of the test tube 12 or 12A in appropriate longitudinal registration relative to the aperture 28 and the objective 24 of the microscope 20.

Referring now to FIG. 5, as well as to FIGS. 3 and 4, base 32 of holder 30 preferably is in the form of an assembly which includes an upper base plate 42 and a lower base plate 44. Upper base plate 42 extends longitudinally between a first end 46 and a second end 48. A slotted portion 50 passes through the upper base plate 42 and extends between an open end 52 at the first end 46 of the base plate 42 and a closed end 54 intermediate the ends 46 and 48 of the upper base plate 42. Lower base plate 44 extends longitudinally between a first end 56 and a second end 58. A slotted portion 60 passes through the lower base plate 44 and extends between an open end 62 at the first end 56 of the base plate 44 and a closed end 64 intermediate the ends 56 and 58 of the lower base plate 44. When the upper and lower base plates 42 and 44 are overlapped, as seen in FIGS. 3 and 4, the slotted portions 50 and 60 are juxtaposed to establish the slot 34.

The upper and lower base plates 42 and 44 are slidable relative to one another, in longitudinal directions, when overlapped, so that the length of the base 32 is adjusted selectively to extend across the stage 22 of microscope 20 for affixation of the holder 30 to the stage 22. Affixing means is shown in the form of opposed clamping jaws 70 and 72 on the base 32 of holder 30 which grip the corresponding side edges 74 and 76 of the stage 22 to secure the holder 30 on the stage 22.

Clamping jaw 70 is integral with and extends altitudinally downwardly from the second end 48 of the upper base plate 42 and clamping jaw 72 is integral with and extends altitudinally downwardly from the second end 58 of the lower base plate 44. Threaded fasteners in the form of thumb screws 80 pass through elongate openings 82 in the upper base plate 42 and corresponding elongate openings 84 in the lower base plate 44 and are threaded into threaded holes 86 in a further base plate 88. Holder 30 is located upon and secured to the stage 22 by placing the assembled base plates 42, 44 and 88 upon the stage 22, sliding the upper and lower base plates 42 and 44 relative to one another, with the thumb screws 80 loosened, until the opposed clamping jaws 70 and 72 are engaged tightly with the corresponding edges 74 and 76 of the stage 22, and then tightening the thumb screws 80 to secure the holder 30 on the stage 22. The range of movement of the upper and lower base plates 42 and 44 is determined by the longitudinal length of the elongate openings 82 and 84. That range enables the holder 30 to be adapted to a variety of microscopes having stages of different widths between edges 74 and 76.

The further base plate 88 includes a further slot 90 and the threaded holes 86 are located intermediate the ends 92 of the further base plate 88, essentially equidistant from the ends 92, and between the further slot 90 and corresponding side edges 94 of the further base plate 88. Thus, upon sliding the upper and lower base plates 42 and 44 longitudinally relative to one another, and relative to further base plate 88, the slot 34 established by slotted portions 50 and 60, as well as further slot 90, though changed in longitudinal length, remains so located relative to the ends of the holder 30 as to always be registered with objective 24, aperture 28 and light source 26. Once the base 32 is extended to the appropriate length and the clamping jaws 70 and 72 grip the corresponding edges 74 and 76 of the stage 22, the thumb screws 80 are tightened and the holder 30 is secured in place upon the stage 22 of the microscope 20. The test tube 12 is then placed readily in the slot 34 and is registered with the objective 24, the aperture 28 and the light source 26 for microscopic examination of the sample 10. The above-described procedure is accomplished while the sample 10 remains in the test tube 12 and thus reduces the time and expense which otherwise would be required for microscopic examinations in which a microscope slide must be prepared. In addition, the sample 10 remains isolated within the test tube 12 and is less likely to contaminate the surroundings and spread any infectious virus or disease.

Once the holder 30 is secured in place on the stage 22, as described above, the holder 30 may remain in place without affecting use of the microscope 20 in the microscopic examination of slides prepared in connection with other tests. To this end, the lateral spacing between the thumb screws 80 is such that a microscopic slide of standard dimensions will fit between the thumb screws 80, as illustrated in phantom at 100 in FIG. 4, for registration with the objective 24, the aperture 28 and the light source 26, thereby enabling observation of the slide 100 through the objective 24 of the microscope 20.

It will be seen that the present invention attains the several objects and advantages summarized above; namely: Reduces the time required for the examination procedure in that both the macro-examination and the microscopic examination procedures can be accomplished with the specimen retained in the same standard test tube; simplifies the microscopic examination procedure and reduces expense in that no separate slide is required for the microscopic examination; essentially eliminates any possibility of contamination which could be caused by an infectious specimen, as by the spread of a viral infection such as hepatitis or AIDS, or by any blood-transmitted disease, since the specimen remains in the same test tube throughout the entire test procedure; enables the processing of a greater number of biological specimens within a shorter time, while maintaining accuracy; increases the efficiency of laboratory technicians through the elimination of the added task of preparing microscope slides and the concomitant tedium of the task; provides a simple and economically manufactured apparatus which is adapted readily to practically all laboratory microscopes enabling widespread use in the expeditious and accurate attainment of test results with minimal modification of such existing equipment; enables modification of existing microscopes for a more expeditious testing procedure, without precluding use of the modified microscope for the examination of standard specimen-examination slides; and meets the demand for the testing of larger numbers of biological specimens, with speed and accuracy, while maintaining safety.

It is to be understood that the above detailed description of a preferred embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A holder which facilitates the examination in a microscope of a biological specimen placed within a transparent cylindrical specimen-retention tube of standard diameter, the microscope including a frame, a microscope objective on the frame and a light source, the holder comprising:
   a base;
   a slot passing through the base in an altitudinal direction, the slot extending longitudinally along the base and having a lateral width less than the standard diameter of the tube, the lateral width of the slot being great enough to retain the tube on the base against inadvertent lateral rolling movement out of registration with the slot; and
   affixing means on the base for affixing the base to the frame of the microscope in place between the microscope objective and the light source and with the slot registered in altitudinal alignment with the objective and the light source of the microscope and oriented generally horizontally such that upon placement of the tube in the slot, in longitudinal alignment with the slot, the tube will be retained in place between the objective and the light source in a generally horizontal orientation for microscopic examination of the biological specimen.

2. The invention of claim 1 wherein the affixing means includes adjusting means for adjusting the affixing means to the corresponding portion of the frame of the microscope while maintaining the slot in altitudinal alignment with the objective and the light source of the microscope.

3. The invention of claim 2 wherein the affixing means includes longitudinally opposed clamping jaws selectively moveable toward and away from one another for clamping the corresponding portion of the frame between the clamping jaws while the slot remains in altitudinal alignment with the objective and the light source.

4. The invention of claim 3 wherein the base includes first and second base plates overlapping with one another and moveable in longitudinal sliding movement relative to one another throughout a range of movement, each base plate including a slotted portion, the slotted portions being registered with one another throughout the range of movement of the base plates for establishing said slot and maintaining the slot in altitudinal alignment with the objective and the light source, and the affixing means includes securing means for selectively securing the first and second base plates against movement relative to one another.

5. The invention of claim 4 wherein each one Of the opposed clamping jaws is located on a corresponding one of the first and second base plates.

6. The invention of claim 5 wherein the securing means includes threaded fasteners for selectively fastening the first and second base plates against movement relative to one another.

7. The invention of claim 6 wherein the threaded fasteners are located laterally at either side of the slot and are spaced apart laterally a sufficient distance to enable the selective placement of a microscope slide between the threaded fasteners and in registration with the slot.

8. The invention of claim 6 wherein the base includes a third base plate juxtaposed with the first and second base plates and having a further slot registered with the slotted portions of the first and second base plates, the first and second base plates being slidable longitudinally along the third base plate.

9. The invention of claim 8 wherein the threaded fasteners are threaded into the third base plate.

10. The invention of claim 9 wherein the first and second base plates each include longitudinally elongate openings spaced laterally from the corresponding slotted portions, the corresponding longitudinally elongate openings of the first and second base plates being registered with one another and with a corresponding threaded fastener so as to define the range of longitudinal movement of the first and second base plates relative to one another, each threaded fastener passing through corresponding elongate openings to enable said threading of the threaded fasteners into the third base plate for affixing the first and second base plates against movement relative to one another.

11. The invention of claim 10 wherein the first base plate overlies the second base .plate altitudinally above the second base plate and the slotted portion of the first base plate includes upwardly-facing beveled edges for supporting the specimen-retention tube in registration with the slot.

12. The invention of claim 11 wherein the specimen-retention tube has opposite ends and the slotted portion of the first base plate includes an open end and a closed end, the closed end of the slotted portion having a configuration generally complementary to the corresponding end of the specimen-retention tube, and the beveled edges include a bevel at the closed end of the slotted portion of the first base plate for facilitating location of the corresponding end of the specimen-retention tube at the closed end for facilitating location of the corresponding end of the specimen-retention tube at the ,closed end of the slotted portion of the first base plate.

13. The invention of claim 1 wherein the base includes first and second base plates overlapping with one another and moveable in longitudinal sliding movement relative to one another throughout a range of movement, each base plate including a slotted portion, the slotted portions being registered with one another throughout the range of movement of the base plates for establishing said slot and maintaining the slot in altitudinal alignment with the objective and the light source, and the affixing means includes securing means for selectively securing the first and second base plates against movement relative to one another.

14. The invention of claim 13 wherein the first base plate overlies the second base plate altitudinally above the second base plate and the slotted portion of the first base plate includes beveled edges for supporting the specimen-retention tube in registration with the slot.

15. The invention of claim 14 wherein the specimen-retention tube has opposite ends of standard configuration and the slotted portion of the first base plate includes an open end and a closed end, the closed end of the slotted portion having a configuration generally complementary to the configuration of the corresponding end of the specimen-retention tube, and the beveled edges include a bevel at the closed end of the slotted portion of the first base plate for facilitating location of the corresponding end of the specimen-retention tube at the closed end of the slotted portion of the first base plate.

* * * * *